United States Patent [19]

Marrero et al.

[11] Patent Number: 5,038,263
[45] Date of Patent: Aug. 6, 1991

[54] RIPPLE CURRENT REDUCTION CIRCUIT

[75] Inventors: Joseph Marrero, Diamond Bar; Christopher Peng, Walnut, both of Calif.

[73] Assignee: EG&G Power Systems, Inc., Covina, Calif.

[21] Appl. No.: 460,376

[22] Filed: Jan. 3, 1990

[51] Int. Cl.⁵ .............................................. H02M 1/14
[52] U.S. Cl. ..................................... 363/20; 323/222; 363/24; 363/47
[58] Field of Search .................... 363/16, 18, 20, 24, 363/45-48; 323/222, 282, 355, 356; 336/165, 170

[56] References Cited

U.S. PATENT DOCUMENTS

| | | |
|---|---|---|
| 1,920,948 | 8/1933 | Crouse . |
| 3,553,620 | 1/1971 | Cielo et al. ........................ 336/165 |
| 3,916,286 | 10/1975 | Waehner . |
| 4,184,197 | 1/1980 | Cuk et al. ......................... 363/16 |
| 4,186,437 | 1/1980 | Cuk ................................... 363/16 |
| 4,257,087 | 3/1981 | Cuk ................................... 363/16 |
| 4,274,133 | 6/1981 | Cuk et al. ......................... 363/39 |
| 4,415,959 | 11/1983 | Vinciarelli ......................... 363/21 |
| 4,674,019 | 6/1987 | Martinelli ......................... 363/20 |
| 4,734,839 | 3/1988 | Barthold ........................... 363/16 |
| 4,858,093 | 8/1989 | Sturgeon ........................... 363/20 |
| 4,961,128 | 10/1990 | Bloom ............................... 363/16 |

OTHER PUBLICATIONS

Severns et al., "Modern DC-to-DC Switchmode Power Converter Circuits", Van Nostrand Reinhold Electrical/Computer Science and Engineering Series, 1985, pp. 280–282 and 295.

Ed Bloom, "6.1.3 The Generalized Use of Integrated Magnetics and Zero-Ripple Techniques in Switch Mode Power Converters", originally printed IEEE Power *Electronics Specialists Conference*, PESC '84, Gaithersburg, Md., Jun. 18–21, 1984.

*Primary Examiner*—William H. Beha, Jr.
*Attorney, Agent, or Firm*—Finnegan, Henderson, Farabow, Garrett & Dunner

[57] ABSTRACT

An improvement is provided for a circuit having a first winding of $N_1$ turns connected in series with a total inductance of L across a first voltage $V_1$ and a second steering winding of $N_2$ turns connected in series with a total inductance $L_2$ across a second voltage $V_2$ with the second winding magnetically coupled to the first winding and the first winding having an inductance $L_c$ produced by the $N_1$ turns as seen across the first winding comprising $L_1$ set substantially greater to zero and $L_2$ set substantially equal to $(L_c) (N_2/N_1)^2 ((V_2/V_1)(N_1/N_2)-1))$. The setting of $L_1$ and the setting of $L_2$ providing an improvement to reduce ac ripple current.

12 Claims, 12 Drawing Sheets

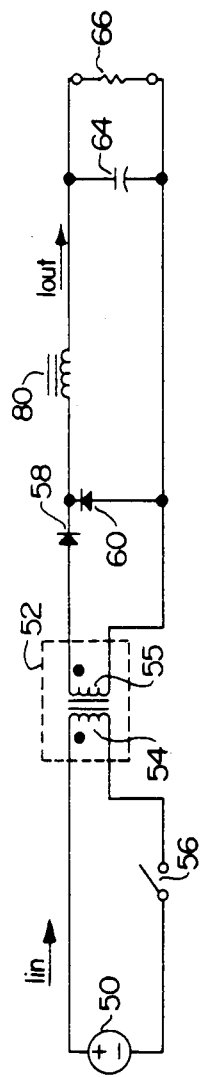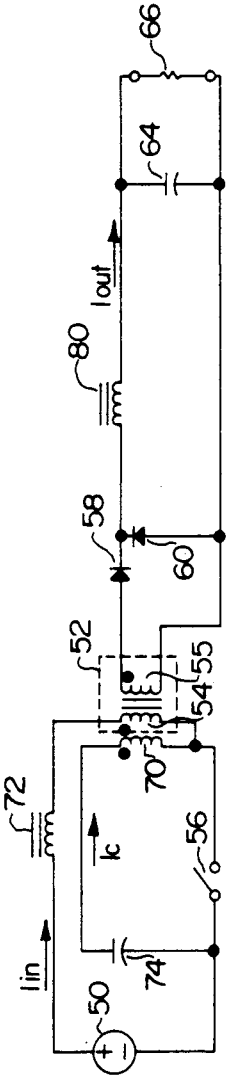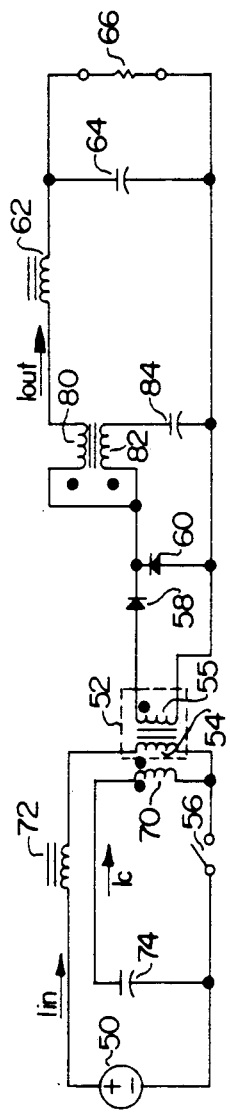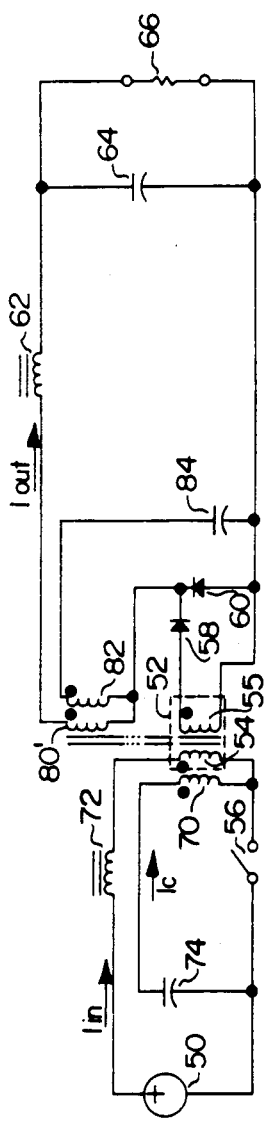

RIPPLE CURRENT REDUCTION CIRCUIT

BACKGROUND OF THE INVENTION

1. Field of the Invention

The present invention relates to a circuit to reduce ripple current in a first winding by employing a second steering winding magnetically coupled to that first winding.

2. Description of the Related Art

FIG. 1 is a schematic representation of an idealized winding 10 which comprises $N_1$ turns, an inductance $L_c$ produced by those turns and a leakage inductance of $L_{L1}$. The inductance $L_{L1}$ is that produced by flux leakage associated with winding 10 and the inductance $L_c$ is the magnetizing inductance produced by the turns $N_1$ wound on a ferromagnetic core. Leakage inductance $L_{L1}$ changes as winding 10 becomes magnetically coupled to other windings. The circuit of FIG. 1 shows winding 10 connected in series with a total inductance $L_1$ comprising $L_{ext1}$ plus $L_{L1}$, where $L_{ext1}$ is the inductance of an external inductor 12. A voltage $V_1$ is shown connected across the total inductance $L_1$ and the $N_1$ turns of winding 10. A voltage $V_{L1}$ appears across $L_1$ and a voltage $V_{Lc}$ appears across $L_c$.

The change in current through winding 10 at any given time, $di_1/dt$, is referred to as the ripple current. The ripple current $di_1/dt$ is defined in accordance with Farraday's Law as being equal to the voltage $V_1$ divided by the total inductance $L_1$ plus $L_c$. The ripple current is also equal to $V_{L1}/L_1$ and to $(V_1-V_{Lc})/L_1$.

In many applications, the existence of a ripple current is undesirable and various prior art methods have been employed to reduce ripple current to zero. One such scheme is shown in FIG. 2 which comprises the utilization of a second steering winding 20 of $N_2$ turns connected in series with a total inductance $L_2$ across a second voltage $V_2$. The total inductance $L_2$ of FIG. 2 comprises the leakage inductance $L_{L2}$ of winding 20 and the inductance $L_{ext2}$ of any externally connected inductor 22. In FIG. 2 the inductance $L_c$ again represents that produced by the turns $N_1$ of winding 10 as seen across that first winding 10.

According to conventional teachings, the ripple current $di_1/dt$ found in winding 10 can be reduced to zero if the voltage $V_{L1}$ across $L_1$ can be reduced to zero. Since voltage source $V_1$ is applied across the series combination of $L_1$ and $L_c$, if the coupling of windings 10 and 20 can be made to induce a voltage $V_1$ across inductance $L_c$ alone, the resultant voltage across $L_1$ will be zero and the ripple current $di_1/dt$ will be zero. The prior art achieves this result by choosing the ratio of $N_1$ to $N_2$ and the value of $L_2$ to satisfy the following equation:

$$L_2 = (N_2/N_1)^2 (L_c)((aN_1/N_2)-1) \quad (1.$$

When this relationship is achieved, the voltage across $L_1$ is zero so that the ripple current $di_1/dt$ is also reduced to zero. When the relationship is not maintained, ripple current $di_1/dt$ results. If both windings 10 and 20 are excited by the same source, "a" equals 1 and, according to equation (1), either $L_2$ must be zero or $N_1/N_2$ must be greater than 1. As a practical matter, $L_2$ can never be zero; therefore, $N_1/N_2$ must be greater than 1. For a limited range of $L_2$ and $L_c$, the ratio $N_1/N_2$ can be adjusted to meet the requirements of equation (1). To maximize the opportunities for the adjustment of the ratio $N_1/N_2$ to meet equation (1), the geometry of winding 20 may be adjusted to affect the leakage inductance $L_{L2}$ or additional external inductance may be added $L_{ext2}$ to influence the final value of $L_2$. Adjustment of the turns ratio may be impractical if there are only a few turns.

Although the value of $L_1$ in such a prior art circuit is theoretically irrelevant to the reduction of the ripple current $di_1/dt$, $L_1$ is conventionally set as close to zero as possible to minimize ac flux core loss due to changing current in the winding of $L_1$.

This prior art technique is particularly effective in environments where the ratio between $N_1$ and $N_2$ can be varied sufficiently to permit $L_2$ to fall within an achievable range. However, the prior art represented by FIG. 2 cannot be utilized when the winding with $N_1$ turns is magnetically coupled with a third winding with $N_3$ turns as shown in FIG. 3 to form a transformer 30 having a turns ratio $N_1$ to $N_3$. If the technique of FIG. 2 is applied to the circuit of FIG. 3, the additional turns $N_2$ of winding 20 materially alters the effective operation of transformer 30. Specifically, the technique of FIG. 2 requires the ratio of $N_1/N_2$ to be greater than 1, thereby causing the winding 20 to affect the overall operation of transformer 30. It should be noted that in FIG. 3, capacitor 32 is connected in series with winding 20 and any external additional inductance $L_{ext2}$. Capacitor 32 in combination with first voltage source $V_1$ replaces second voltage source $V_2$. The technique of replacing second voltage source $V_2$ using a capacitor 32 is known in the prior art.

SUMMARY OF THE INVENTION

It is, accordingly, an objective of the present invention to provide an improved circuit to reduce ripple current in a first winding using a second magnetically coupled steering winding.

A further objective of the subject invention is to provide an improved circuit to reduce ripple current in a first winding using a second magnetically coupled steering winding when the first winding is employed with a third winding to form a transformer.

Additional objectives and advantages of the invention will be set forth in part in the description which follows, and in part will be obvious from that description or may be learned by practice of the invention.

To achieve the foregoing objectives and in accordance with the purposes of the invention as embodied and broadly described herein, there is provided in a circuit having a first winding of $N_1$ turns connected in series with a total inductance $L_1$ across a first voltage $V_1$ and a second, steering winding of $N_2$ turns connected in series with a total inductance of $L_2$ across a second voltage $V_2$, the second winding magnetically coupled to the first winding and the first winding having an inductance $L_c$ produced by the $N_1$ turns as seen across the first winding, an improvement to reduce ripple current in the first winding comprising: (a) $L_1$ set substantially greater than zero; and (b) $L_2$ set to substantially equal $(L_c)(N_2/N_1)^2((V_2/V_1)(N_1/N_2)-1))$ which is preferably equal to zero. In the circuit of the present invention $V_1$ may equal $V_2$ and $N_2$ may be set equal to $N_1$. It is further preferable that $V_1/N_1$ be set equal to $V_2/N_2$. Still further, the first winding is, in a preferred embodiment, magnetically coupled to a third winding to form a transformer.

BRIEF DESCRIPTION OF THE DRAWINGS

FIG. 5 is a circuit diagram of a conventional forward converter;

FIG. 6 is a circuit diagram of a forward converter incorporating the teachings of the present invention to provide input ac ripple current steering;

FIG. 7 is a circuit diagram of a forward converter incorporating the teachings of the present invention to provide input and output ac ripple current steering;

FIG. 8 is a variation of the circuit of FIG. 7 using integrated magnetics;

DESCRIPTION OF THE PREFERRED EMBODIMENT

Reference will now be made in detail to the present preferred embodiment of the subject invention and illustrated in the accompanying drawings.

Figure 1:
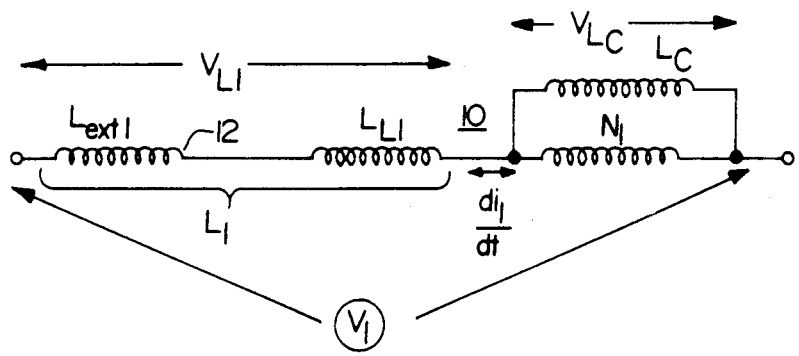
FIG. 1 is a circuit diagram of a conventional winding and external inductor series connected relationship used to explain the meaning of ripple current.
Figure 2:
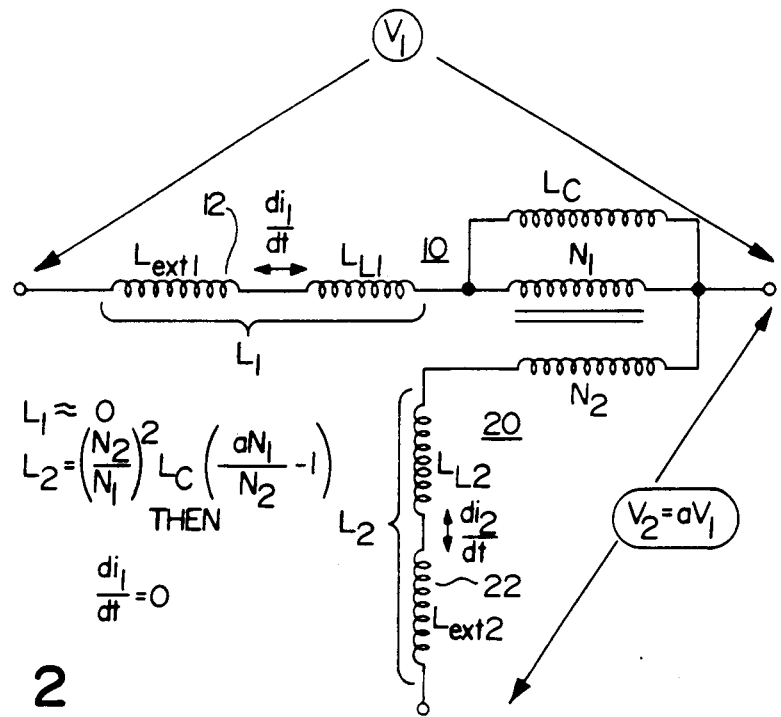
FIG. 2 is a circuit diagram used to explain a prior art technique for reducing ripple current.

Simply stated, the subject invention comprises an improvement to the circuit of FIG. 2 to reduce ripple current from the first winding 10 of that circuit. In the prior art, ripple current in first winding 10 was reduced by attempting to adjust the relationship of $L_2$, $L_c$, $N_1$ and $N_2$ so that the voltage from the second voltage source $V_2$ reflected back across $L_c$ would precisely equal $V_1$, thereby establishing a zero voltage across $L_1$ and, as a consequence, reducing the ripple current $di_1/dt$ through $L_1$ to zero. In such prior art teachings, the value of $L_1$ is effectively essentially set to zero.

In accordance with the teachings of the present invention, $L_1$ is set substantially greater than zero. By setting $L_1$ substantially greater than zero and $L_2$ substantially equal to $(N_2/N_1)^2$ $(L_c)$ $((V_2/V_1)(N_1/N_2)-1))$, the voltage $V_1$ across the series combination of $L_1$ and $L_{c2}$ appears substantially all across $L_c$, rendering the voltage across $L_1$ substantially equal to zero and thereby reducing the ripple current $di_1/dt$ substantially to zero. In the most generic form of the subject invention, $L_2$ is selected in the same manner as taught in the prior art, i.e., $L_2=(N_2/N_1)^2$ $(L_c)$ $((V_2/V_1)(N_1/N_2)-1))$. However, in this instance, with $L_1$ set substantially greater than zero, $N_1$ may be set precisely equal to $N_2$. In this instance, $L_2$ may be set substantially equal to zero. With $N_1$ equal to $N_2$, the technique of the subject invention may be employed in an embodiment such as that shown in FIG. 3 where $N_1$ is a first winding magnetically coupled to a third winding $N_3$ to form a transformer 30.

Figure 4:
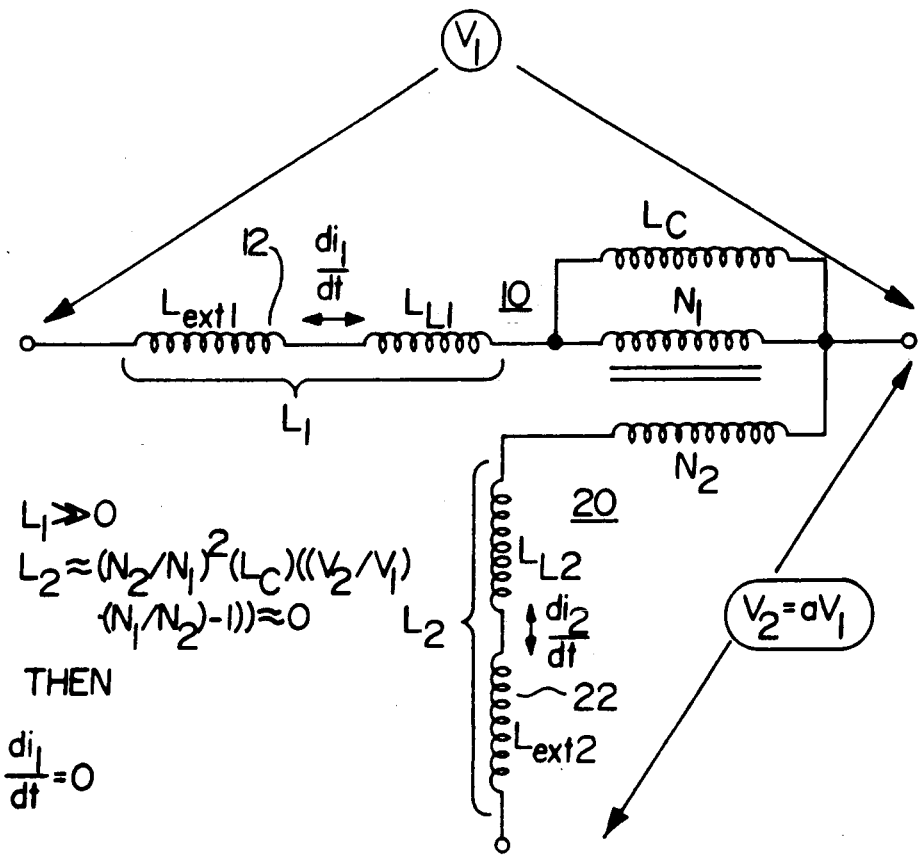
FIG. 4 is a circuit diagram incorporating the teachings of the present invention.

Specifically, as shown in FIG. 4, there is provided a circuit having a first winding 10 of $N_1$ turns connected in series with a total inductance $L_1$ across a first voltage $V_1$ and a second, steering winding 20 of $N_2$ turns connected in series with a total inductance $L_2$ across a second voltage $V_2$. Second winding 20 is magnetically coupled to first winding 10 and first winding 10 has an inductance of $L_c$ produced by the $N_1$ turns as seen across the first winding 10. $L_1$ may comprise the leakage inductance of winding 10, $L_{L1}$, either alone and/or in series combination with an additional inductor 12 having an inductance $L_{ext1}$. Likewise, total inductance $L_2$ may comprise leakage inductance $L_{L2}$ of winding 20 either alone and/or in combination with an external inductor 22 having an inductance $L_{ext2}$. Voltage sources $V_1$ and $V_2$ are generic representations of either ac, dc or pulse dc voltage sources. Voltage source $V_2$ is related to voltage source $V_1$ by the equation $V_2 = aV_1$, where "a" is a positive real number constant.

The foregoing description of FIG. 4 is equally applicable to the prior art. However, unlike the prior art, in accordance with the present invention, $L_1$ is set substantially greater than zero and $L_2$ is preferably set as close to zero as possible. In a preferred embodiment with "a" equal to 1, $N_1$ is preferably set equal to $N_2$. Where "a" does not equal one, preferably $L_2$ is again set substantially equal to zero and $V_1/N_1$ is set substantially equal to $V_2/N_2$.

Figure 3:
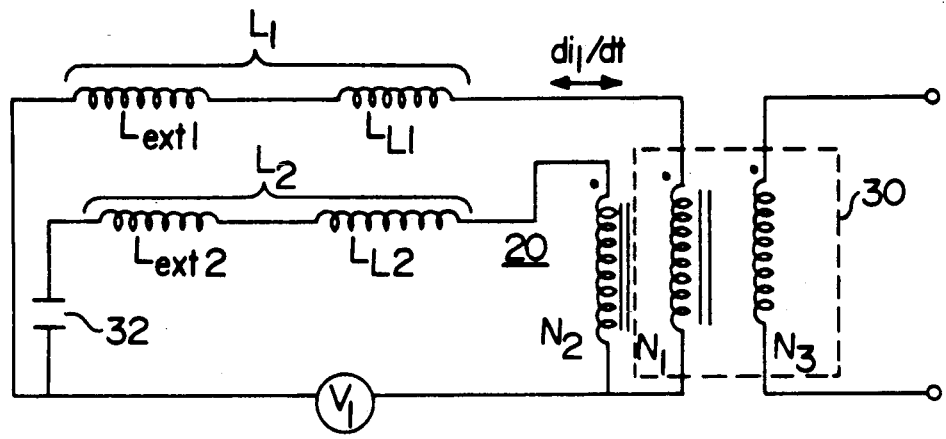
FIG. 3 is a circuit diagram used to explain the difficulties encountered should the prior art technique of FIG. 2 be applied to a winding coupled as part of a transformer.

As should be understood by those skilled in the art, the emphasis of the circuit according to the subject invention is setting $L_1$ substantially greater than zero and setting $L_2$ substantially equal to zero to thereby shift substantially all of the voltage $V_1$ across $L_c$, thereby permitting $N_1$ to equal $N_2$. With $N_1$ equal to $N_2$, the improvement of the subject invention may be employed with winding 10 magnetically coupled to a third winding, with $N_3$ turns to form a transformer 30 as shown in FIG. 3.

The teachings of the present invention are applicable to a wide variety of conventional circuits. For example, FIG. 5 shows a conventional forward converter. The forward converter of FIG. 5 includes a voltage source 50, a transformer 52 having a primary winding 54 and a secondary winding 55, a switch 56, diodes 58 and 60, an output inductor 80, a capacitor 64, and a resistor 66. Voltage source 50 in combination with switch 56 provides a first voltage source $V_1$. As shown in FIG. 5, voltage source 50 is connected across primary winding 54 of transformer 52 by switch 56. Secondary winding 55 of transformer 52 is coupled across the parallel combination of capacitor 64 and resistor 66 by the series combination of diode 58 and inductor 80. Diode 60 is coupled across secondary winding 55 to complete, in combination with diode 58, a rectifier circuit. The operation of the forward converter of FIG. 5 should be well known to those skilled in the art. Resistor 66 represents a load.

FIG. 6 is a schematic diagram of the forward converter of FIG. 5 incorporating the teachings of the present invention. Similar components are identically numbered as they were in FIG. 5. However, the circuit of FIG. 6 further includes an additional winding 70, an inductor 72, and a capacitor 74. Winding 70 is a steering winding magnetically coupled to winding 54. Voltage source 50 in combination with switch 56 provides a first voltage source $V_1$. The series combination of steering winding 70 and capacitor 74 is coupled between one end of primary winding 54 and the junction of voltage source 50 and switch 56. Capacitor 74 in combination with switch 56 provides a second voltage source $V_2$. Capacitor 74 is sufficiently large to carry ac ripple current. Inductor 72 is inserted between voltage source 50 and primary winding 54. In accordance with the present invention, inductor 72 operates to provide a total inductance in series with primary winding 54 which is substantially greater than zero. Preferably, the total inductance connected in series with steering winding 70 is set substantially equal to $(N_1/N_2)^2 (L_c) ((V_2/V_1) (N_1/N_2) - 1))$ and, with $N_1$ equal to $N_2$, therefore substantially to zero, where $N_1$ is the number of turns of primary winding 56, $N_2$ is the number of turns of steering winding 70, and $L_c$ is the inductance across primary winding 54.

In operation of the circuit of FIG. 6, the voltage of voltage source 50 is stored in capacitor 74 in combination with switch 56 when switch 56 is open. This causes capacitor 74 in combination with switch 56 to operate as a voltage source $V_2$ across steering winding 70. With inductor 72 having an inductance substantially greater than zero, the voltage $V_1$ from source 50 in combination with switch 56 substantially appears across primary winding 54 and the ac ripple current which ordinarily would have occurred in $I_{in}$ is steered from primary winding 54 through steering winding 70 and capacitor 74. As a consequence, the ac ripple current in primary winding 54 is set substantially equal to zero.

Preferably, the number of turns of winding 54 is equal to the number of turns of steering winding 70. This enables winding 70 to be magnetically coupled to winding 54 without affecting the turns ratio operation of transformer 52 and creating circulating current between winding 54 and winding 70. Preferably, winding 70 is wound closest to the core of transformer 52 and winding 54 is wound furthest from the core.

In FIG. 6, the teachings of the present invention were employed to steer input ac ripple current through steering winding 70. The circuit of FIG. 7 is identical to the circuit of FIG. 6 with the addition of winding 62, winding 82, and capacitor 84 which are used, in accordance with the teachings of the present invention, to steer output ac ripple current away from resistor 66. Specifically, inductor 62 is coupled in series with winding 80, winding 82 is a steering winding magnetically coupled to winding 80 and electrically coupled at one end to the common node of diodes 58 and 60 and at the other end at the common node of capacitor 64 and resistor 66. Inductor 62 in the embodiment of FIG. 7 operates as an external inductance coupled in series with winding 80. The total inductance $L_1$ in series with winding 80 is set, in accordance with the teachings of the present invention, substantially greater than zero. The total inductance connected in series with winding 82 is preferably set as close as possible to zero and, in any event, is set to equal to $(N_2/N_1)^2 (L_c) ((V_2/V_1) (N_1/N_2) - 1))$ where $L_c$ is the inductance across winding 80, $N_1$ is the number of turns of winding 80, and $N_2$ is the number of turns of winding 82. Preferably, $N_1$ equals $N_2$. In operation, output ac ripple current which would normally have appeared as a component of the output current $I_{out}$ is steered through steering winding 82 and capacitor 84 to avoid the load comprising capacitor 64 and resistor 66. The capacitor 64 is sufficiently large to carry ac ripple current.

FIG. 8 is a variation on the forward converter circuit of FIG. 7 and is essentially identical to that circuit with the exception that winding 80 has been replaced with a winding 80' which has a common magnetic core with transformer 52. Windings 80' and 82 are not magnetically linked to windings 54, 55 and 70.

Figure 9:
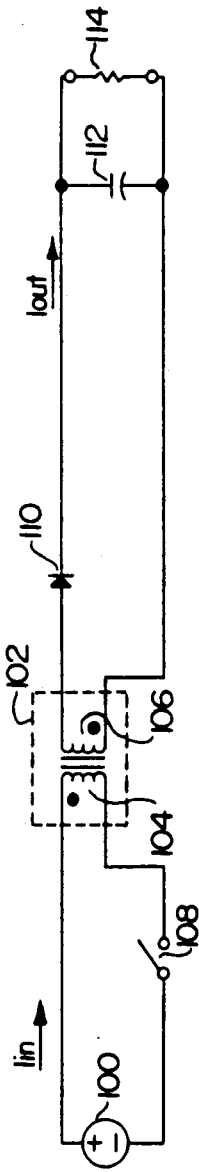
FIG. 9 is a circuit diagram of a conventional fly-back converter.

FIG. 9 is a circuit diagram of a conventional fly-back converter comprising voltage source 100, transformer 102 having a primary winding 104 and a secondary winding 106, a switch 108, a a diode 110, a capacitor 112, and a resistor 114. As is shown in FIG. 9, voltage source 100 is connected across primary windings 104 by switch 108. Voltage source 100 in combination with switch 108 provides a first voltage source $V_1$. Secondary winding 106 is connected across the parallel combination of capacitor 112 and resistor 114 by diode 110. The operation of the fly-back converter of FIG. 9 is well known to those skilled in the art.

Figure 10:
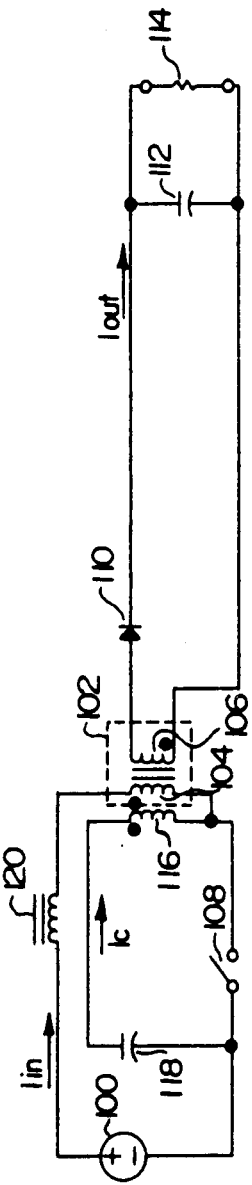
FIG. 10 is a circuit diagram of a fly-back converter incorporating the teachings of the present invention to provide input ac ripple current steering.

FIG. 10 is a circuit diagram of the fly-back converter of FIG. 9 incorporating the teachings of the present invention. The circuit of FIG. 10 is identical to that of FIG. 9 with the exception of the addition of a winding 116, a capacitor 118, and an inductance 120. Winding 116 is magnetically coupled to primary winding 104 of transformer 102. The series combination of winding 116 and capacitor 118 is coupled across switch 108 and inductor 120 is coupled in series with primary winding 104 between primary winding 104 and voltage source 100. Winding 116, capacitor 118 and inductor 120 operate identical to winding 70, capacitor 74 and inductor 72 of FIG. 8.

Figure 11:
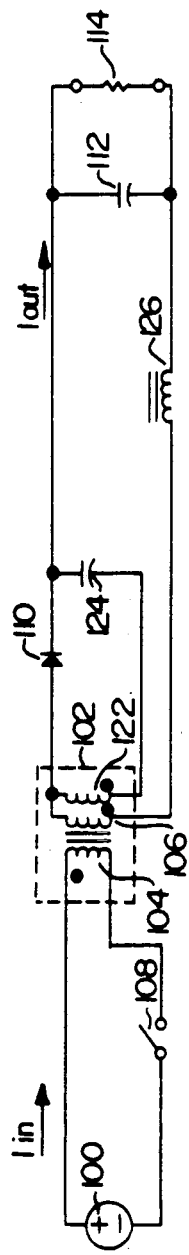
FIG. 11 is a circuit diagram of a fly-back converter incorporating the teachings of the present invention to provide output ac ripple current steering.

The circuit of FIG. 11 is a fly-back converter identical to that of FIG. 9 with the addition of a winding 122, a capacitor 124, and an inductor 126. Winding 122 is magnetically coupled to secondary winding 106 and the series combination of winding 122 and capacitor 124 is electronically coupled across diode 110. Inductor 126 is coupled in series between secondary winding 106 and the common node of capacitor 112 and resistor 114. The operation of winding 122, capacitor 124 and inductor 126 is identical to the operation of winding 116, capacitor 118 and conductor 120 of FIG. 10 with the exception that output ripple current is being steered through winding 122 in FIG. 11, whereas input ripple current is being steered through winding 116 of FIG. 10.

Figure 12:
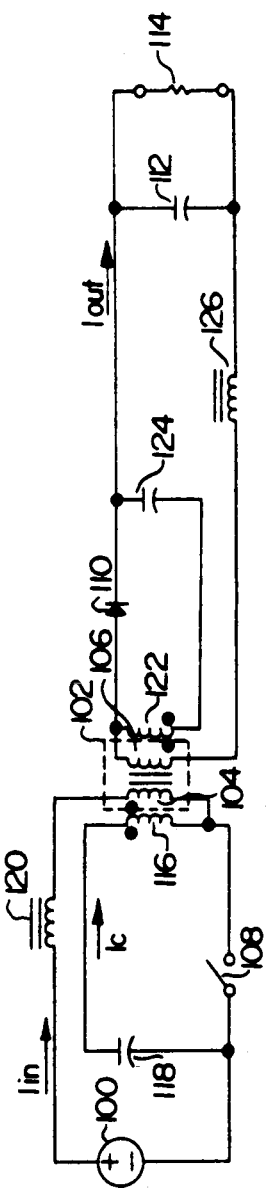
FIG. 12 is a circuit diagram of a still further fly-back converter incorporating the teachings of the subject invention to provide input and output ac ripple current steering.

FIG. 12 incorporates the input ripple suppression circuit comprising winding 116, capacitor 118 and inductor 120 of FIG. 10 and the output ripple suppression circuit comprising winding 122, capacitor 124 and inductor 126 of FIG. 11 in a single circuit. Because the teachings of the present invention permit the number of turns of winding 116 to equal the number of turns of winding 104 and permit the number of turns of winding 106 to equal the number of turns of winding 122, both input and output ripple current on both sides of transformer 102 may be steered away from the respective source 102 and the load comprising the parallel combination of capacitor 112 and resistor 114.

Figure 13:
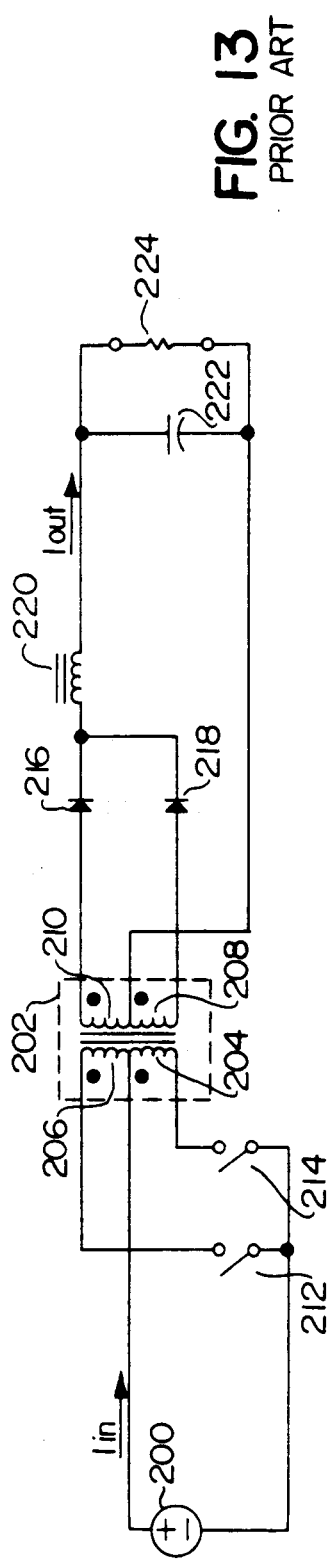
FIG. 13 is a circuit of a prior art push-pull (Buck) converter.

FIG. 13 is a circuit diagram of a prior art push-pull (Buck) converter which comprises a voltage source 200, a transformer 202 having a first primary winding 204 and a second primary winding 206, and having a first secondary winding 208 and a second secondary winding 210, switches 212 and 214, diodes 216 and 218, inductor 220, capacitor 222, and resistor 224. The interconnection of these parts is shown in FIG. 13 and both the interconnection and operation should be well known to those skilled in the art.

Figure 14:
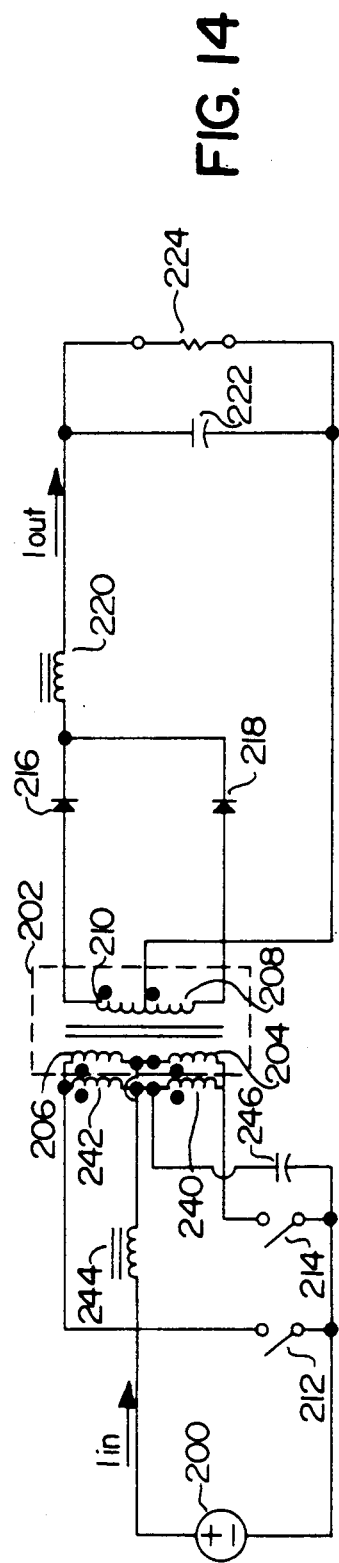
FIG. 14 is a schematic diagram of a push-pull (Buck) converter incorporating the teachings of the present invention to provide input ac ripple current steering.

FIG. 14 is a circuit diagram of the conventional push-pull (Buck) converter of FIG. 13 with an additional circuit for input ac ripple current steering in accordance with the present invention. This additional circuit comprises winding 240, winding 242, inductance 244 and capacitor 246. Winding 240 is magnetically coupled to first primary winding 204, whereas winding 242 is magnetically coupled to second primary winding 206. Windings 240 and 242 are connected together at a common node which in turn is connected through capacitor 246 to the common node of switches 212 and 214 and voltage source 200. Inductor 244 is connected in series between voltage source 200 and the common node of primary windings 204 and 206. The operation of windings 242, capacitor 246 and inductor 244 is essentially identical to the operation of winding 70, capacitor 74 and inductor 72 of FIG. 6.

Figure 15:
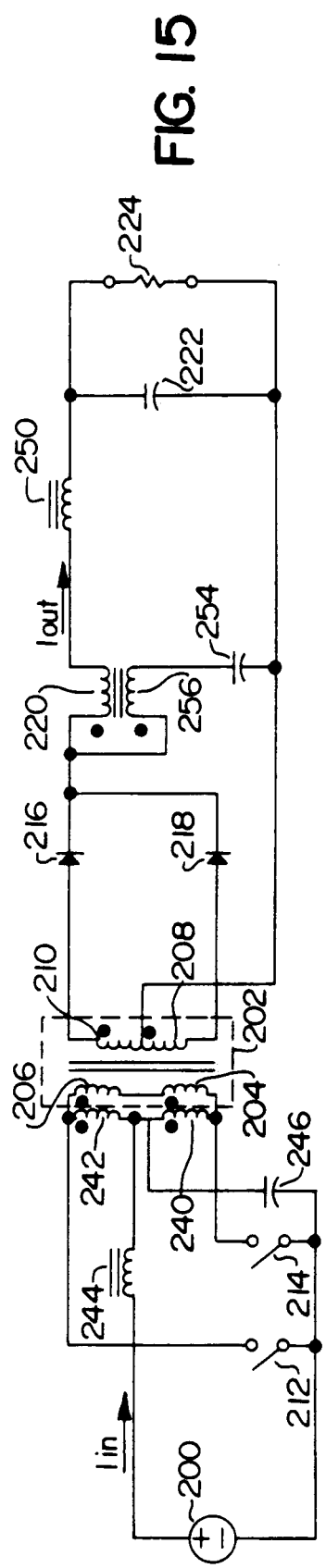
FIG. 15 is a circuit diagram of a push-pull (Buck) converter incorporating the teachings of the present invention to provide input and output ac ripple current steering.

FIG. 15 is identical to the circuit of FIG. 14 with the exception of the addition o windings of 250 and 252 and capacitor 254. Winding 220 is coupled in series with inductor 250 between the common node of diodes 216 and 218 and the common node of capacitor 222 and resistor 224. Winding 252 is coupled in series with capacitor 254 between the common node of diodes 216 and 218 and the other common node of capacitor 222 and resistor 224. Winding 220, inductor 250, winding 252, and capacitor 254 operate essentially identical to the corresponding winding 80, inductor 62, winding 82, and capacitor 84 of the circuit of FIG. 7.

Figure 16:
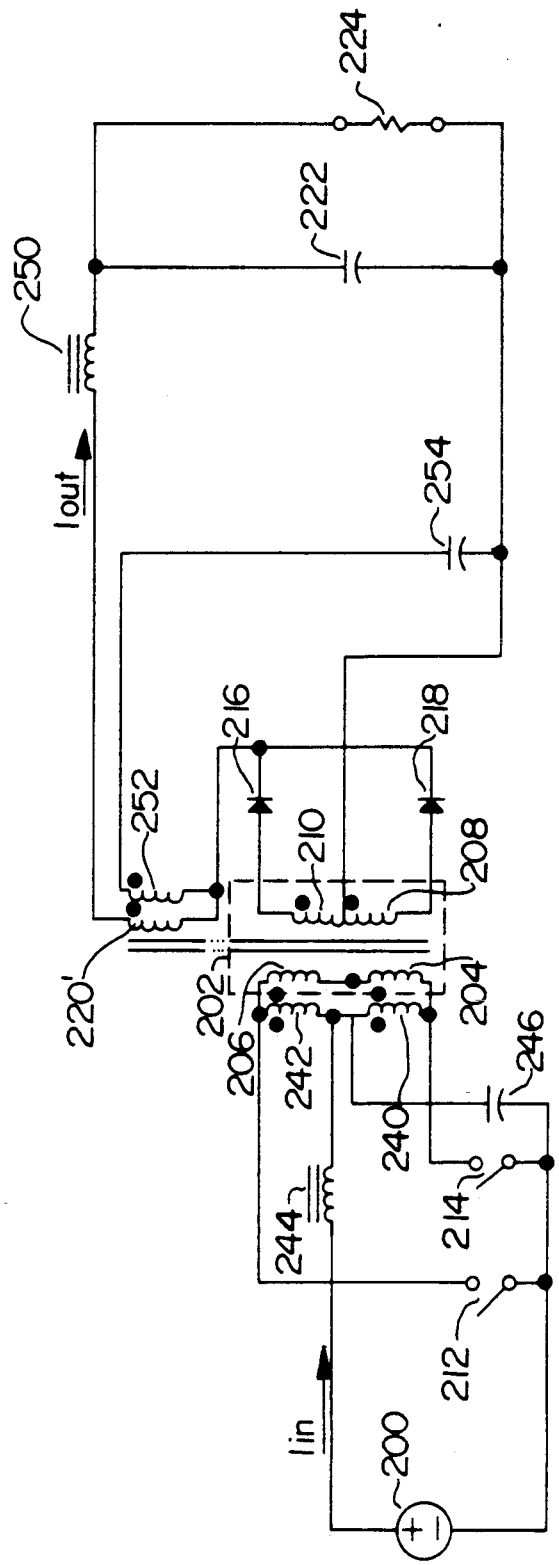
FIG. 16 is a variation of the circuit of FIG. 15 using integrated magnetics.

FIG. 16 is a circuit diagram of a push-pull (Buck) converter with input and output ac current ripple steering according to the teachings of the present invention. The circuit of FIG. 16 is identical to the circuit of FIG. 15 with the exception that winding 220 has been replaced with a winding 220' which has common magnetics with transformer 202.

Figure 17:
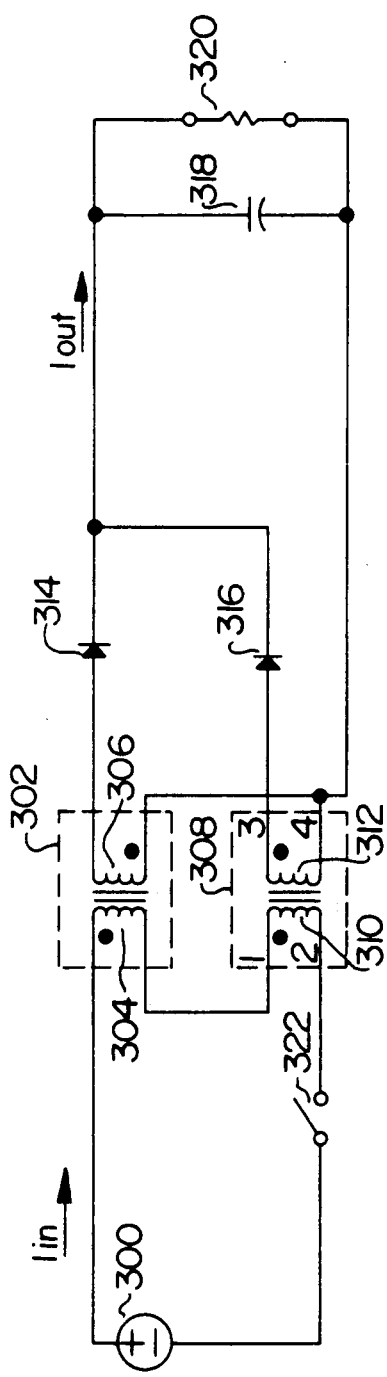
FIG. 17 is a circuit diagram of a prior art single-ended Weinberg converter.

FIG. 17 is a circuit diagram of a prior art single-ended Weinberg converter. The converter of FIG. 17 comprises voltage source 300, transformer 302 having primary winding 304 and secondary winding 306, switch 322, transformer 308 having primary winding 310 and secondary winding 312, diodes 314 and 316, capacitor 318, and resistor 320. These components are all connected in the well-known manner shown in FIG. 17, and their operation should be well understood by those skilled in the art.

Figure 18:
FIG. 18 is a circuit diagram of a single-ended Weinberg converter incorporating the teachings of the present invention to provide input ac ripple current steering.

FIG. 18 is a circuit diagram of a single-ended Weinberg converter incorporating the teachings of the subject invention to steer input ac ripple current. Specifically, the circuit of FIG. 18 is identical to that of FIG. 17 with the exception of the addition of winding 330, capacitor 332 and inductor 334. Winding 330 is a steering winding magnetically coupled to winding 304. The turns of winding 330 are preferably equal to the turns of winding 304. Capacitor 332 is connected in series with winding 330 and is connected to the common node of source 300 and switch 322. Inductor 334 is connected in series with primary winding 304 and source 300. In accordance with the invention, the value of the inductance connected in series with winding 304, including external inductor 334 is set substantially greater than zero and the inductance connecting series with winding 330 is preferably set as close to zero as possible. Accordingly, the winding 330, capacitor 332 and inductor 334 operate essentially identical to the winding 70, capacitor 74 and inductor 72 of the circuit of FIG. 6.

Figure 19:
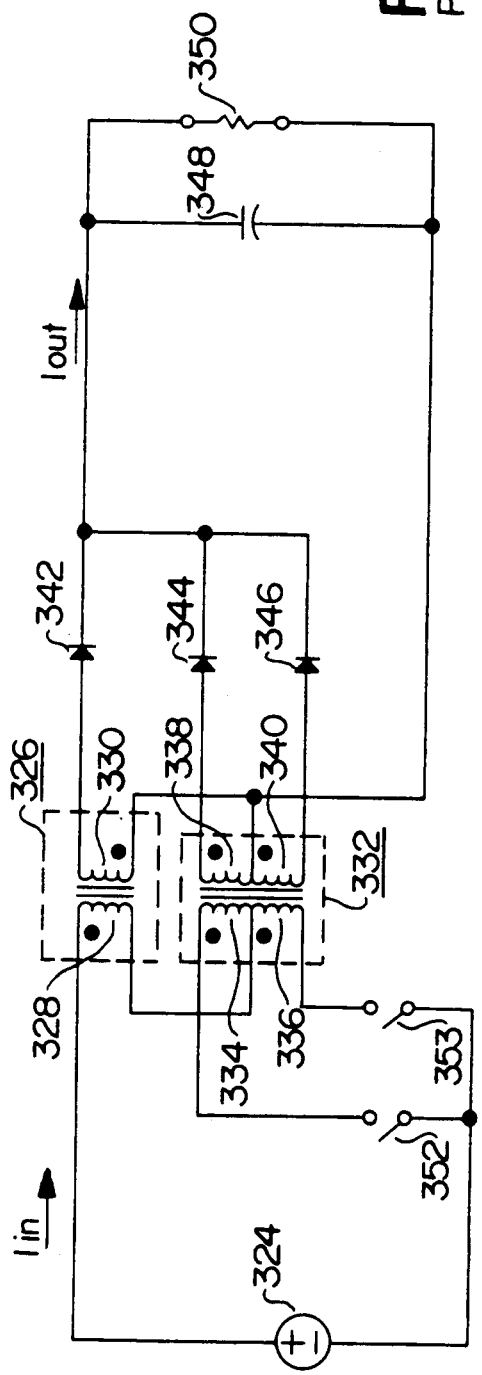
FIG. 19 is a circuit diagram of a prior art push-pull Weinberg converter.

FIG. 19 is a circuit diagram of a prior art push-pull Weinberg converter comprising voltage source 324, transformer 326 including primary winding 328 and secondary winding 330, transformer 332 comprising a first primary winding 334 and a second primary winding 336 and a first secondary winding 338 and a second secondary winding 340, diodes 342, 344 and 346, capacitor 348, resistor 350, and switches 352 and 353. The interconnection of these components is well known as shown in FIG. 19, and the operation of the conventional converter of FIG. 19 should be well understood to those skilled in the art.

Figure 20:
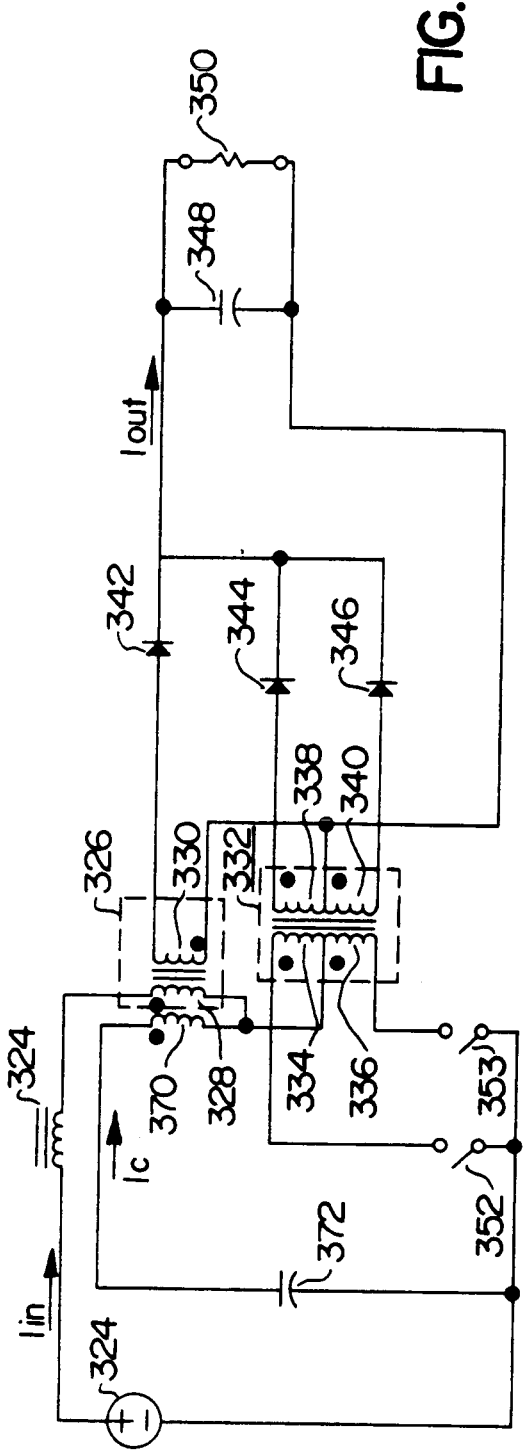
FIG. 20 is a schematic diagram of a push-pull Weinberg converter incorporating the teachings of the present invention to provide input ac ripple current steering.

FIG. 20 is a circuit diagram of a push-pull Weinberg converter incorporating the teachings of the present invention to provide ac ripple current steering. The components of the circuit of FIG. 20 are identical to those of FIG. 19 with the addition of winding 370, capacitor 372, and inductor 374. Winding 370 is magnetically coupled to primary winding 328 of transformer 326 and is electrically coupled as a steering winding in series with capacitor 372. Inductor 374 is coupled in series with primary winding 328 and voltage source 324. As should be understood in view of the foregoing descriptions, winding 370, capacitor 372 and inductor 374 operate essentially identical to winding 70, capacitor 74 and inductor 72 of the circuit of FIG. 6 to steer input ac ripple current from winding 328 through winding 370.

Figure 21:
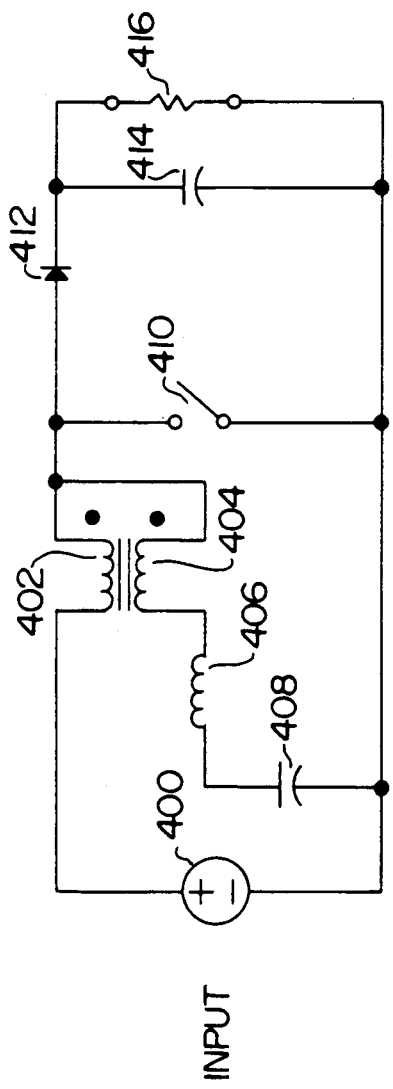
FIG. 21 is a circuit diagram of a conventional boost converter modified for zero input ripple current.

FIG. 21 is a circuit diagram of a prior art boost converter modified for zero input current ripple in accordance with the teachings of the prior art. Specifically, the boost converter of FIG. 21 comprises a voltage source 400, a first winding 402, a second winding 404, an inductor 406, a capacitor 408, a switch 410, a diode 412, a capacitor 414, and a resistor 416. As is known to those skilled in the art winding 402 is connected in series with switch 410 across voltage source 400 and the series combination of diode 412 and the parallel combination of capacitor 414 and resistor 416 is also connected across switch 410. The circuit comprising these components makes up a traditional boost converter. Winding 404 is a steering winding magnetically coupled to winding 406 and electrically coupled in series with inductor 406 and capacitor 408 from the common node of winding 408 in switch 410 to the common node of voltage source 400 and switch 410. As was discussed above, in accordance with teachings of the prior art, the value of the turns of winding 402 and winding 404 and the value of the inductance connected in series with winding 404, primarily the external inductor 406, are adjusted so as to maintain zero input current ripple through winding 402.

Figure 22:
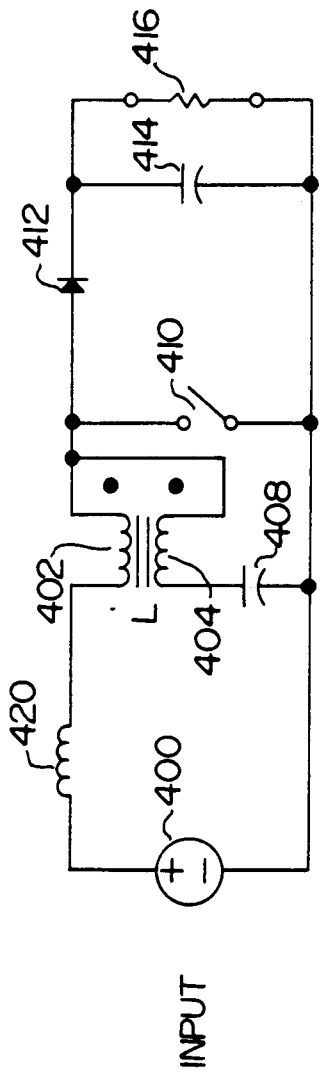
FIG. 22 is a circuit diagram of a boost converter incorporating the teachings of the present invention to provide ac ripple current steering.

In FIG. 22, there is shown a circuit diagram of a boost converter which is similar to the converter of FIG. 21, but incorporates the teachings of the present invention. Specifically, inductor 406 has been eliminated to signify, in accordance with the teachings of the present invention, that the inductance coupled in series with winding 404 is set as close as possible to zero. An additional inductor 420 is shown connected between voltage source 400 and primary winding 402 and, in accordance with the teachings of the present invention, the inductance of inductor 420 is set substantially greater than zero. With this setting, ac ripple is steered through winding 404 and away from winding 402.

Figure 23:
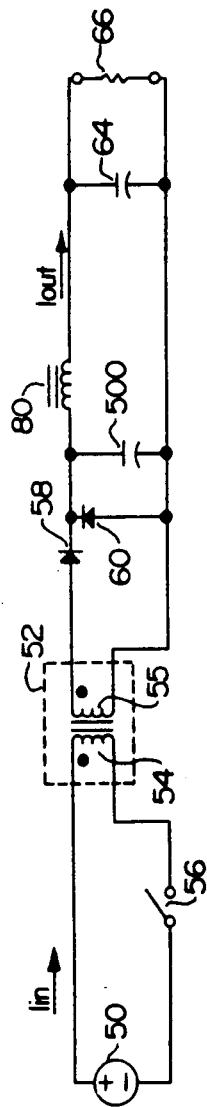
FIG. 23 is a circuit diagram of a prior art forward converter switching at zero current.

FIG. 23 is a schematic diagram of a prior art forward converter switching at zero current. In this regard, it is identical to the prior art forward converter of FIG. 5 with the exception of the addition of a capacitor 500 connected in parallel across the series combination of inductor 80, and the parallel connection of capacitor 64 and resistor 66. The operation of the forward converter of FIG. 23 should be well known to those skilled in the art.

Figure 24:
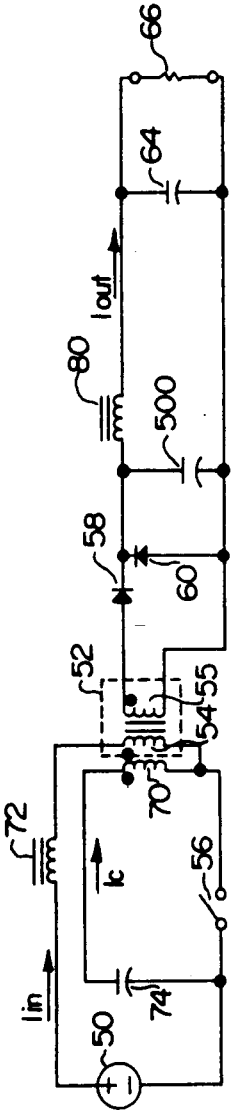
FIG. 24 is a circuit diagram of a forward converter switching at zero current incorporating the teachings of the present invention to provide input ac ripple current steering.

FIG. 24 is a circuit diagram of a forward converter switching at zero current which incorporates the teachings of the present invention. As can be seen, the circuit of FIG. 24 is identical to the circuit of FIG. 6 with the addition of capacitor 500.

Figure 25:
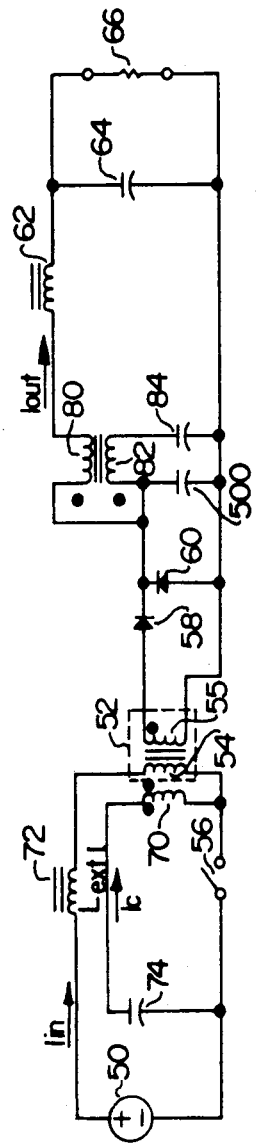
FIG. 25 is a circuit diagram of a forward converter switching at zero current incorporating the teachings of the present invention to provide input and output ac ripple current steering.

The circuit of FIG. 25 which is a forward converter switching at zero current incorporating the teachings of the subject invention to provide input and output ac ripple current steering is identical to the circuit of FIG. 7 with the addition of capacitor 500.

Figure 26:
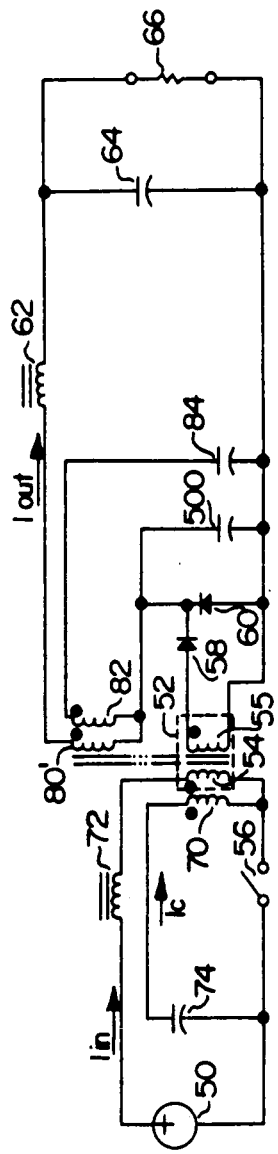
FIG. 26 is a variation of the circuit of FIG. 25 using integrated magnetics.

FIG. 26 is a circuit diagram of a forward converter switching at zero current incorporating the subject invention to provide input and output ac ripple current steering and integrated magnetics. The circuit of FIG. 26 is identical to the circuit of FIG. 8 with the addition of capacitor 500.

Figure 27:
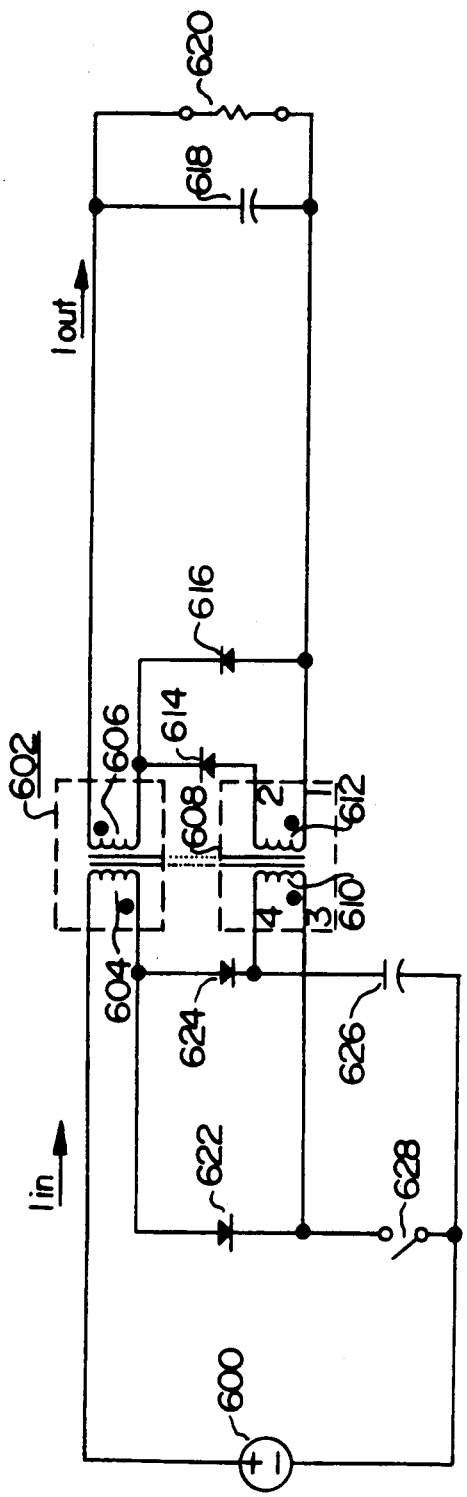
FIG. 27 is a circuit diagram of a prior art source voltampere/load volt-ampere differential converter.

The converter of FIG. 27 comprises voltage source 600, transformer 602 including having primary winding 604 and secondary winding 606, transformer 608 having primary winding 610 and secondary winding 612, diodes 614 and 616, capacitor 618, and resistor 620, diodes 622 and 624, capacitor 626, and switch 628. These components are connected in a conventional manner as shown in FIG. 27. The operation of the converter of FIG. 27 should be well understood by those skilled in the art.

Figure 28:
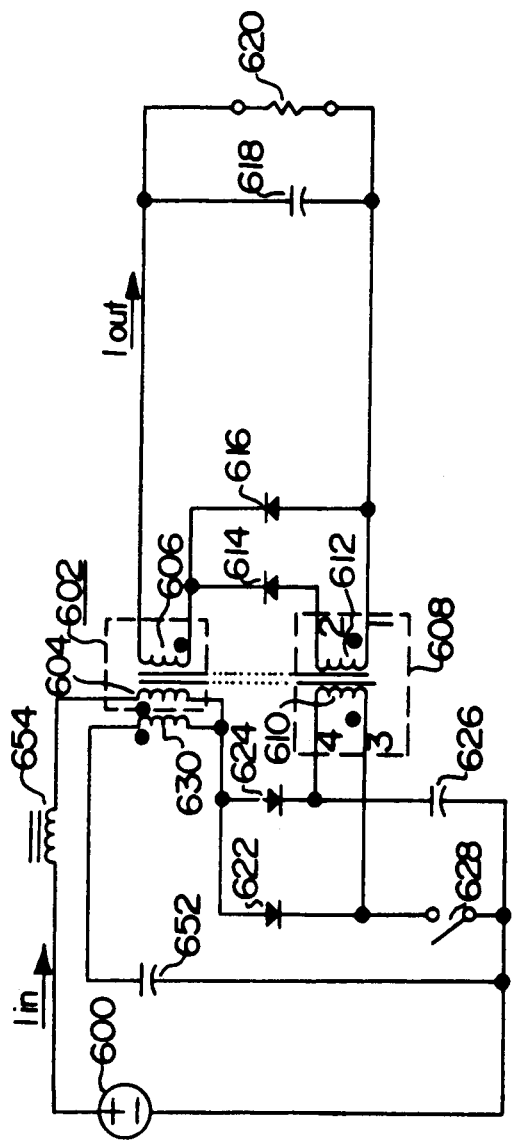
FIG. 28 is a circuit diagram of a source volt-ampere/load volt-ampere differential converter incorporating the teachings of the present invention to provide input ac ripple current steering.

FIG. 28 is a circuit diagram of a source volt-ampere/-load volt-ampere differential converter incorporating the teachings of the subject invention to provide input ac ripple current steering. The circuit of FIG. 28 is identical to that of FIG. 27 with the addition of a winding 650, capacitor 652 and an inductor 654. Winding 650 is a steering winding magnetically coupled to primary winding 604 of transformer 602. Steering winding 650 is coupled in series with capacitor 652 which in turn is coupled to the common node of voltage source 600 and switch 628. Inductor 654 is coupled in series with primary winding 604 of transformer 602 in series with source 600. Winding 650, capacitor 652 and inductor 654 operate essentially identical to the corresponding winding 70, capacitor 74 and inductor 72 of FIG. 6.

Figure 29:
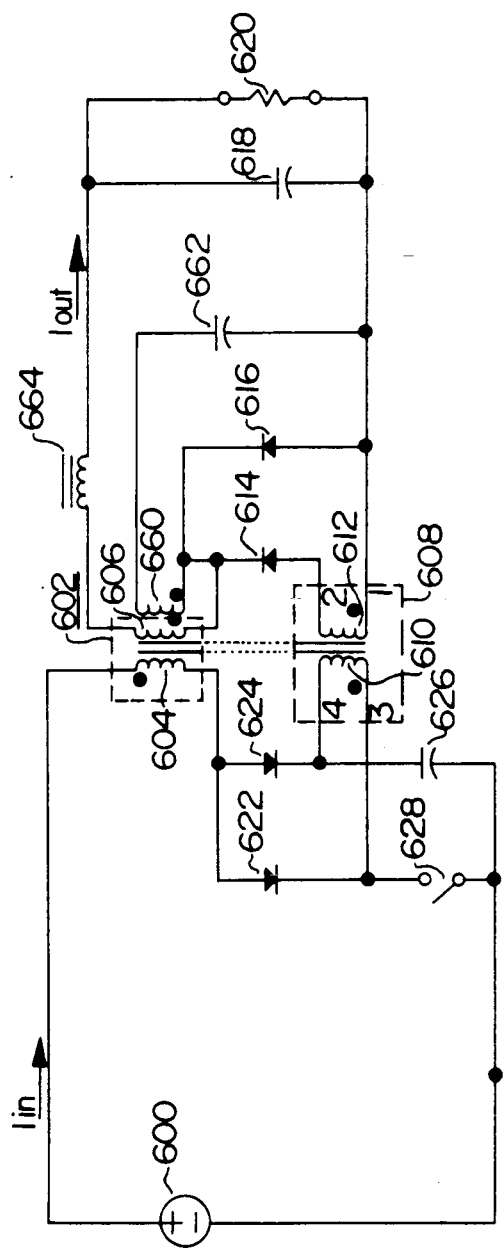
FIG. 29 is a circuit diagram of a source volt-ampere/load volt-ampere differential converter incorporating the teachings of the subject invention to provide output ac ripple current steering.

FIG. 29 is a circuit diagram of a source volt-ampere/-load volt-ampere differential converter incorporating the teachings of the subject invention to provide output ac ripple current steering. The circuit of FIG. 29 is essentially identical to the circuit of FIG. 27 with the addition of a winding 660, capacitor 662 and inductor 664. Winding 660 is magnetically coupled to secondary winding 606 and is connected in series with capacitor 662. Inductor 664 is coupled in series with secondary winding 606. Accordingly, winding 660, capacitor 662 and inductor 664 operate essentially identical to winding 82, capacitor 84 and inductor 62 of the circuit of FIG. 7.

Figure 30:
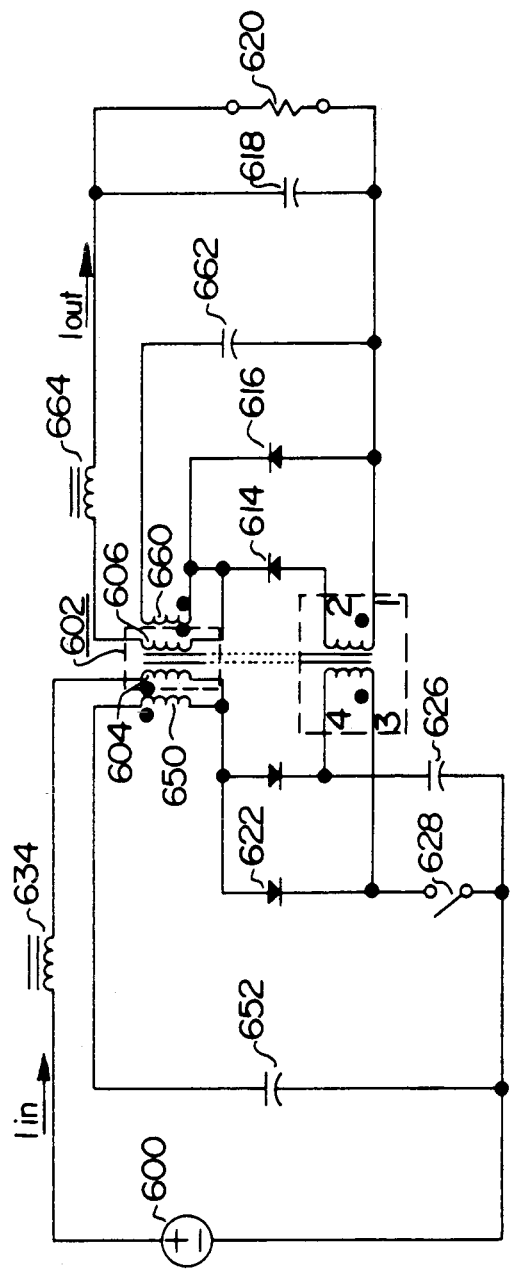
FIG. 30 is a schematic diagram of a source volt-ampere/load volt-ampere differential converter incorporating the teachings of the present invention to provide input and output ac ripple current steering.

FIG. 30 is a circuit diagram of a source volt-ampere/-load volt-ampere differential converter incorporating the teachings of the subject invention to provide input and output ac ripple current steering. The circuit of FIG. 30 is identical to the circuit of FIG. 27, but incorporating the winding 650, capacitor 652 and inductor 654 of FIG. 28 and further incorporating the winding 660, capacitor 662 and inductor 664 of FIG. 29.

Additional advantages and modifications will readily occur to those skilled in the art. The invention in its broader aspects is not, therefore, limited to the specific details, representative methods and illustrative examples shown and described. Accordingly, departures may be made from such details without departing from the spirit or scope of applicants' general inventive concept.

We claim:

1. In a circuit having a first winding of $N_1$ turns connected in series with a total inductance of $L_1$ across a first voltage $V_1$ and a second, steering winding of $N_2$ turns connected in series with a total inductance of $L_2$ across a second voltage $V_2$, said second winding magnetically coupled to said first winding and said first winding having an inductance $L_c$ produced by said $N_1$ turns as seen across said first winding, the improvement to reduce ripple current in said first winding comprising:

(a) $L_2$ set substantially equal to $(N_2/N_1)^2 (L_c) ((V_2/V_1)(N_1/N_2)-1)$.; and (b) $L_1$ set sufficiently greater than $L_2$ to thereby shift substantially all the voltage $V_1$ across $L_c$ which has not otherwise been so shifted due to the setting of $L_2$.

2. The circuit of claim 1 wherein $V_1$ equals $V_2$.

3. The circuit of claim 2 wherein $N_1$ equals $N_2$.

4. The circuit of claim 1 wherein $V_1/N_1$ equals $V_2/N_2$.

5. The circuit of claims 1, 2, 3 or 4 wherein said first winding is magnetically coupled to a third winding to form a transformer.

6. The circuit of claim 5 wherein said transformer has a core and wherein said second steering winding is wound closer to said core than said first and/or third windings and said first winding is wound furthest from said core.

7. In a circuit having a first winding of $N_1$ turns connected in series with a total inductance of $L_1$ across a first voltage $V_1$ and a second, steering winding of $N_2$ turns connected in series with a total inductance of $L_2$ across a second voltage $V_2$, said second winding magnetically coupled to said first winding and said first winding having an inductance $L_c$ produced by said $N_1$ turns as seen across said first winding, the improvement to reduce ripple current in said first winding comprising:

(a) $L_2$ set substantially equal to zero; and (b) $L_1$ set sufficiently greater than $L_2$ to thereby shift substantially all the voltage $V_1$ across $L_c$ which has not otherwise been so shifted due to the setting of $L_2$.

8. The circuit of claim 7 wherein $V_1$ equals $V_2$.

9. The circuit of claim 8 wherein $N_1$ equals $N_2$.

10. The circuit of claim 7 wherein $V_1/N_1$ equals $V_2/N_2$.

11. The circuit of claims 7, 8, 9 or 10 wherein said first winding is magnetically coupled to a third winding to form a transformer.

12. The circuit of claim 11 wherein said transformer has a core and wherein said second steering winding is wound closer to said core than said first and/or third windings and said first winding is wound furthest from said core.

* * * * *